(12) United States Patent
Peters

(10) Patent No.: US 7,624,567 B2
(45) Date of Patent: Dec. 1, 2009

(54) CONVERGENT DIVERGENT NOZZLE WITH INTERLOCKING DIVERGENT FLAPS

(75) Inventor: Donald William Peters, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 104 days.

(21) Appl. No.: 11/231,067

(22) Filed: Sep. 20, 2005

(65) Prior Publication Data

US 2007/0234728 A1    Oct. 11, 2007

(51) Int. Cl.
F02K 1/06 (2006.01)
F02K 1/12 (2006.01)

(52) U.S. Cl. .............. 60/204; 60/771; 239/265.19; 239/265.39

(58) Field of Classification Search .......... 60/204, 60/232, 271, 771; 239/265.19, 265.35, 265.39, 239/265.41
See application file for complete search history.

(56) References Cited

U.S. PATENT DOCUMENTS

| | | | |
|---|---|---|---|
| 3,972,475 A | 8/1976 | Nelson et al. | |
| 4,073,441 A | 2/1978 | Nash et al. | |
| 4,171,093 A | 10/1979 | Honeycutt, Jr. et al. | |
| 4,643,356 A | 2/1987 | Holler et al. | |
| 4,718,230 A | 1/1988 | Honeycutt, Jr. et al. | |
| 4,747,542 A | 5/1988 | Cires et al. | |
| 4,747,543 A | 5/1988 | Madden | |
| 5,000,386 A | 3/1991 | Lybarger | |
| 5,060,472 A | 10/1991 | Schirtzinger | |
| 5,067,324 A | 11/1991 | Beytes et al. | |
| 5,076,496 A | 12/1991 | Lippmeier | |
| 5,080,284 A | 1/1992 | Cires | |
| 5,115,979 A | 5/1992 | Ellerhorst et al. | |
| 5,131,222 A | 7/1992 | Auxier et al. | |
| 5,188,292 A | 2/1993 | Frey et al. | |
| 5,209,059 A | 5/1993 | Ward | |
| 5,215,256 A | 6/1993 | Barcza | |
| 5,239,815 A | 8/1993 | Barcza | |
| 5,239,823 A | 8/1993 | Sims | |
| 5,249,419 A | 10/1993 | Landhuis | |
| 5,269,467 A | 12/1993 | Williams et al. | |
| 5,323,965 A * | 6/1994 | Froemming et al. ..... | 239/265.37 |
| 5,437,411 A | 8/1995 | Renggli | |
| 5,524,438 A | 6/1996 | Johnson et al. | |

(Continued)

FOREIGN PATENT DOCUMENTS

GB    2404222 A    1/2005

OTHER PUBLICATIONS

Search Report EP06253792.

Primary Examiner—Ted Kim
(74) Attorney, Agent, or Firm—Carlson, Gaskey & Olds PC (57) ABSTRACT

A nozzle system includes a multitude of circumferentially distributed convergent flaps, divergent flaps and inter-flap seals which circumscribe an engine centerline and define the radial outer boundary of an exhaust gas path. Each divergent flap includes longitudinal sides having a set of extension which are located at different longitudinal stations such that the extensions on adjacent divergent flaps interfit when the nozzle is in a minimum dilated position yet provide support for the intermediate flap seal when the nozzle is in a maximum dilated position to thereby provide a relative increase in the nozzle area ratio range.

8 Claims, 12 Drawing Sheets

U.S. PATENT DOCUMENTS

| | | |
|---|---|---|
| 5,560,198 A | 10/1996 | Brewer et al. |
| 5,683,034 A | 11/1997 | Johnson et al. |
| 5,797,544 A | 8/1998 | Ward |
| 5,813,611 A | 9/1998 | Cires et al. |
| 5,839,663 A | 11/1998 | Broadway et al. |
| 5,842,643 A * | 12/1998 | Lippmeier ............. 239/265.39 |
| 6,398,129 B1 | 6/2002 | Johnson |
| 6,966,189 B2 * | 11/2005 | Lapergue et al. .............. 60/771 |
| 7,178,325 B2 * | 2/2007 | Arbona ........................ 60/232 |
| 2004/0003585 A1 * | 1/2004 | Allore et al. .................. 60/771 |
| 2004/0040308 A1 * | 3/2004 | Senile et al. .................. 60/771 |
| 2005/0091983 A1 * | 5/2005 | Senile et al. .................. 60/771 |
| 2006/0213198 A1 * | 9/2006 | Arbona et al. ................ 60/771 |

* cited by examiner

CONVERGENT DIVERGENT NOZZLE WITH INTERLOCKING DIVERGENT FLAPS

This invention was made with government support under Contract No.: N00019-02-C-3003. The government therefore has certain rights in this invention.

BACKGROUND OF THE INVENTION

The present invention relates to gas turbine engines having convergent/divergent nozzles, and more particularly to a nozzle which provides an increased area ratio range (exit area/jet area).

A variable area exhaust nozzle optimizes the thrust produced within a gas turbine engine. In augmented gas turbine engines, convergent/divergent (C/D) nozzles provide a multitude of nozzle positions. The term "convergent-divergent" describes an exhaust nozzle having a convergent section upstream of a divergent section. Exhaust gases exiting the turbine(s) pass through the decreasing diameter convergent section before passing through the increasing diameter divergent section.

The convergent section is pivotally connected to the exhaust duct and to the divergent section. The divergent section is pivotally connected to the convergent section and to an external fairing positioned radially outboard of the divergent section. The opposite end of the external fairing is pivotally attached to a static outer case which surrounds a portion of the nozzle.

The variable orifice of the C/D nozzle is typically disposed at an interface between the aft end of the convergent section and the forward end of the divergent section. Orifice area increases and decreases when the aft end of the convergent section is displaced radially outward and inward, respectively.

The nozzle defines a throat or jet area and an exit area. The jet area is the area at which the minimum cross sectional area of the nozzle is defined. The exit area is the aft most section of the nozzle. The area ratio of a nozzle is the exit area divided by the jet area. The area ratio range provides a general indicator of engine performance and an increase in the area ratio range results in more efficient engine performance with increased engine thrust, fuel efficiency and a decrease in actuator loads required to articulate the nozzle.

The convergent and divergent sections generally include flaps and flap seals circumferentially disposed, attached to one of the other sections or to a structural member within the engine. The alternately disposed flaps and flap seals accommodate changes in orifice area and nozzle axis skew (if the nozzle is vectorable) by sliding relative to and overlapping each other as the orifice area decreases or increases.

The ability of a C/D orifice nozzle to change orifice area requires considerable flexibility in each section of the nozzle. Flexibility is provided by the flaps and flap seals overlapping one another and sliding relative to one another during nozzle geometry changes. Disadvantageously, the interfaces between flaps and/or between flaps and flap seals which permit the necessary flexibility may also restrict the area ratio range. An increase in the nozzle exit area at a high mode area ratio typically compromises the low-mode area ratio schedule due to the complexity of the flap and flap seal interface geometry.

Accordingly, it is desirable to provide a C/D exhaust nozzle with an increased high-mode area ratio schedule without compromising the low-mode area ratio schedule.

SUMMARY OF THE INVENTION

The nozzle system according to the present invention includes a plurality of circumferentially distributed convergent flaps, divergent flaps and divergent flap seals which circumscribe an engine centerline and define the radial outer boundary of a core gas path.

Each divergent flap may be described as having a length defined as extending between a forward end and an aft end and a width defined between a first longitudinal side and a second longitudinal side. The forward end of each divergent flap includes a joint structure that forms a portion of a joint along a hinge axis that circumscribes the nozzle centerline.

Each longitudinal side of each divergent flap includes a set of extensions which are located at different axial stations such that the extensions on adjacent divergent flaps interfit when the nozzle is in a minimum dilated position yet provide support for the intermediate flap seal when the nozzle is in a maximum dilated position to increase the area ratio range.

The relative increase in the area ratio range (nozzle circumference increased in maximum position while nozzle circumference maintained in closed position) results in more efficient engine performance with increased engine thrust, fuel efficiency and a significant decrease in actuator loads required to articulate the nozzle between the open and closed positions.

The present invention therefore provides provide a C/D exhaust nozzle with an increased high-mode area ratio schedule without compromising the low-mode area ratio schedule.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
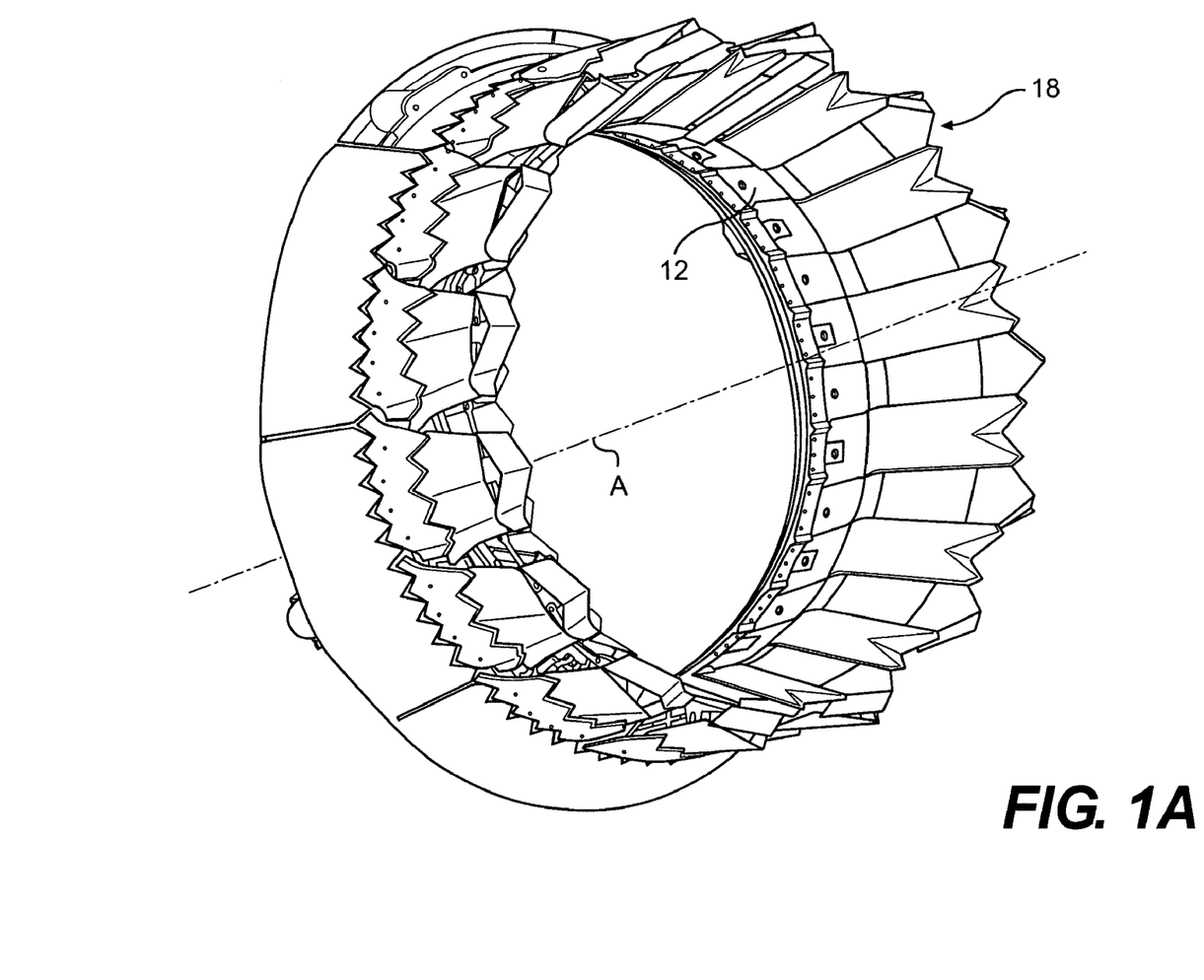
FIG. 1A is a general perspective view of a variable geometry exhaust nozzle of the present invention with the nozzle shown in a maximum position.
Figure 1B:
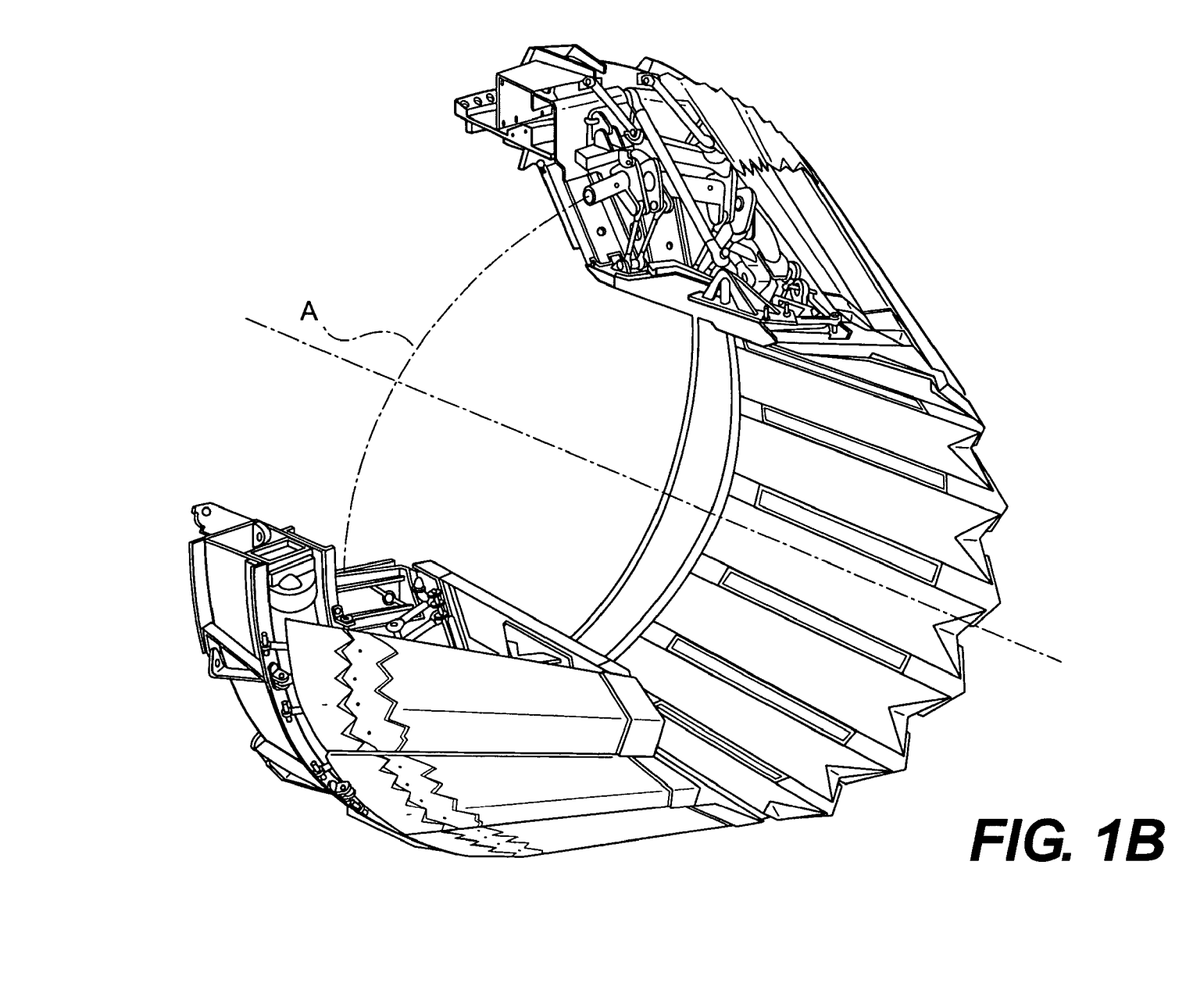
FIG. 1B is a general perspective view of a variable geometry exhaust nozzle of the present invention with the nozzle shown in a minimum position.

FIGS. 1A and 1B illustrate a nozzle system 10 for a gas turbine engine. FIG. 1A depicts the nozzle 10 in a maximum dilated position (also illustrated in FIG. 2A), which is typically used during afterburning operation, and FIG. 1B depicts the nozzle system 10 in a minimal dilated position (FIG. 2B), which is typically used during non-afterburning operation.

Figure 2A:
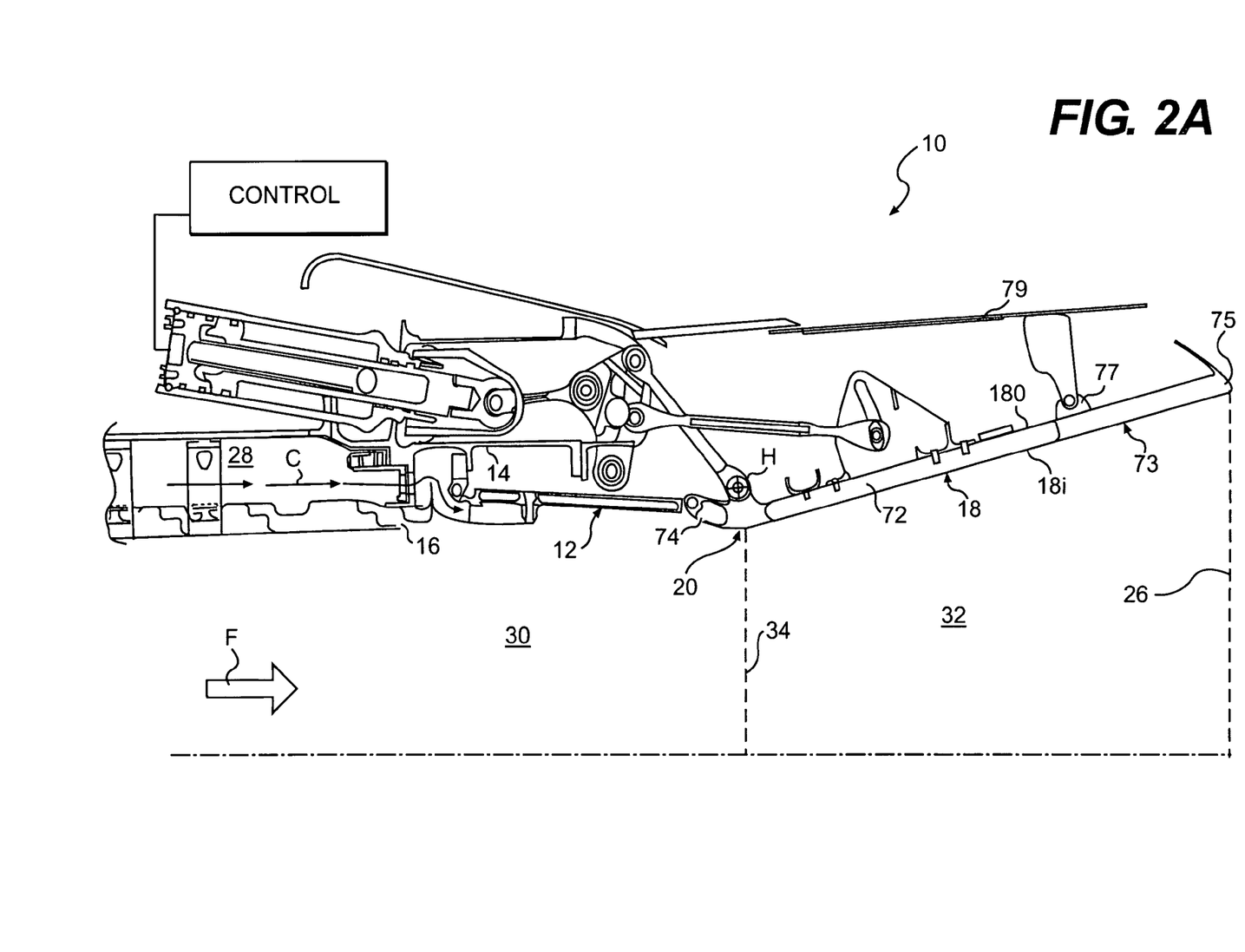
FIG. 2A is a general sectional side view of a variable geometry exhaust nozzle of the present invention with the nozzle shown in a maximum position which corresponds with FIG. 1A, the nozzle being illustrated on only one side of its centerline.
Figure 2B:
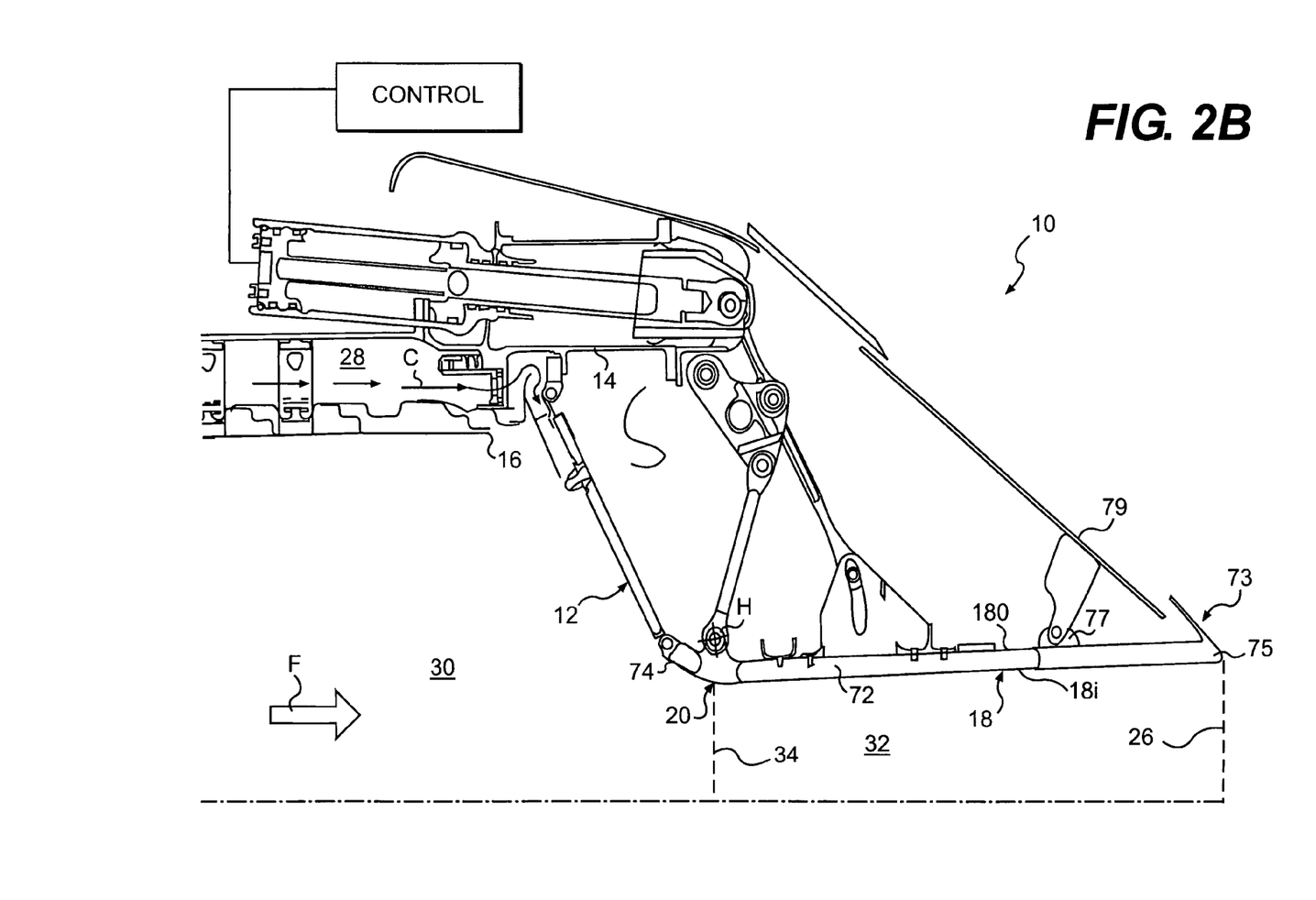
FIG. 2B is a general sectional side view of a variable geometry exhaust nozzle of the present invention with the nozzle shown in a minimum position which corresponds with FIG. 1B, the nozzle being illustrated on only one side of its centerline.

Referring to FIGS. 2A and 2B, the nozzle includes a plurality of circumferentially distributed convergent flaps 12 (only one shown in section), each pivotably connected to a stationary frame 14 with a cooling liner panel 16 upstream thereof. A plurality of circumferentially distributed divergent flaps 18 (only one shown in section) are pivotably connected at a joint 20 to an aft end section of the convergent flaps 12. A plurality of divergent flap seals 21 (FIGS. 4A and 4B) are distributed circumferentially between the divergent flaps 18. Taken collectively, the convergent and divergent flaps 12, 18 and the inter-flap seals 21 circumscribe the nozzle centerline A to define the radial outer boundary of an exhaust gas path 26. During operation, a control system governs the angular orientations of the convergent flaps 12 and divergent flaps 18 to adjust the nozzle throat area 34 and exit area 26 about a nozzle centerline A.

The liner panels 16, taken collectively, form a liner that cooperates with the convergent flaps 12 to define an annular cooling airflow passageway 28. The passageway 28 guides a cooling airflow (illustrated schematically be arrows C) along a radial inner surface of the convergent flaps 12. The cooling airflow C is typically sourced from fan bypass airflow and/or other airflow that is different from a combustion gas flow (illustrated schematically by arrow F). The cooling airflow C at least partially shields the flaps from the intense heat of the core combustion gas airflow F.

The flaps 12, 18 define convergent and divergent sections 30, 32 of the nozzle with the throat 34 or jet area defined therebetween. The throat 34 is the minimum cross sectional area of the nozzle and when compared to the nozzle exit area 26 defines a nozzle area ratio. An increased area ratio range (Exit area/jet area) results in more efficient engine performance with increased engine thrust, fuel efficiency, with a significant decrease in actuator loads required to articulate the nozzle between the open and closed positions.

Figure 3A:
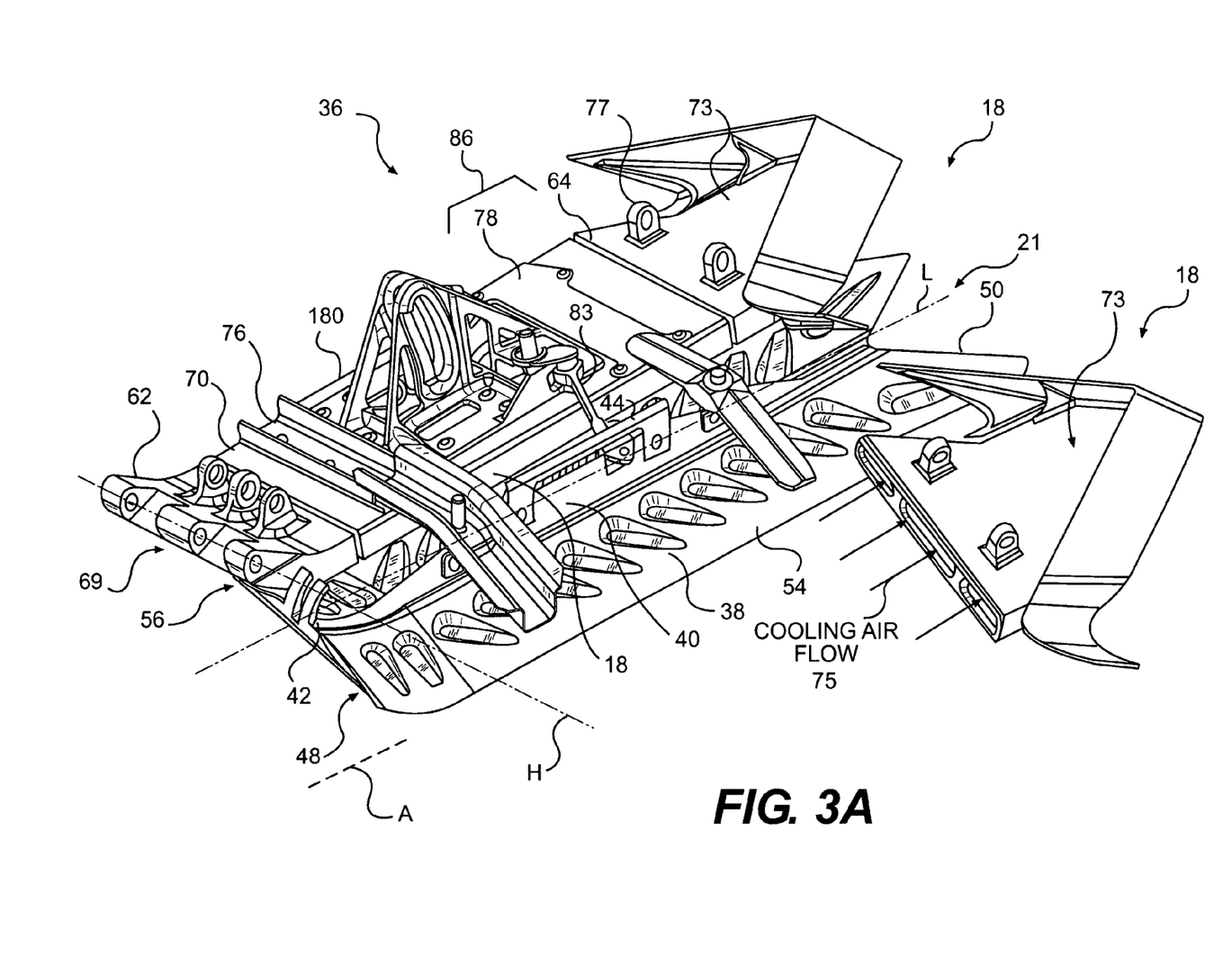
FIG. 3A is a general perspective view of a divergent section of the variable geometry exhaust nozzle from a cold side with an external flap removed and with the divergent section shown in a maximum position.
Figure 3B:
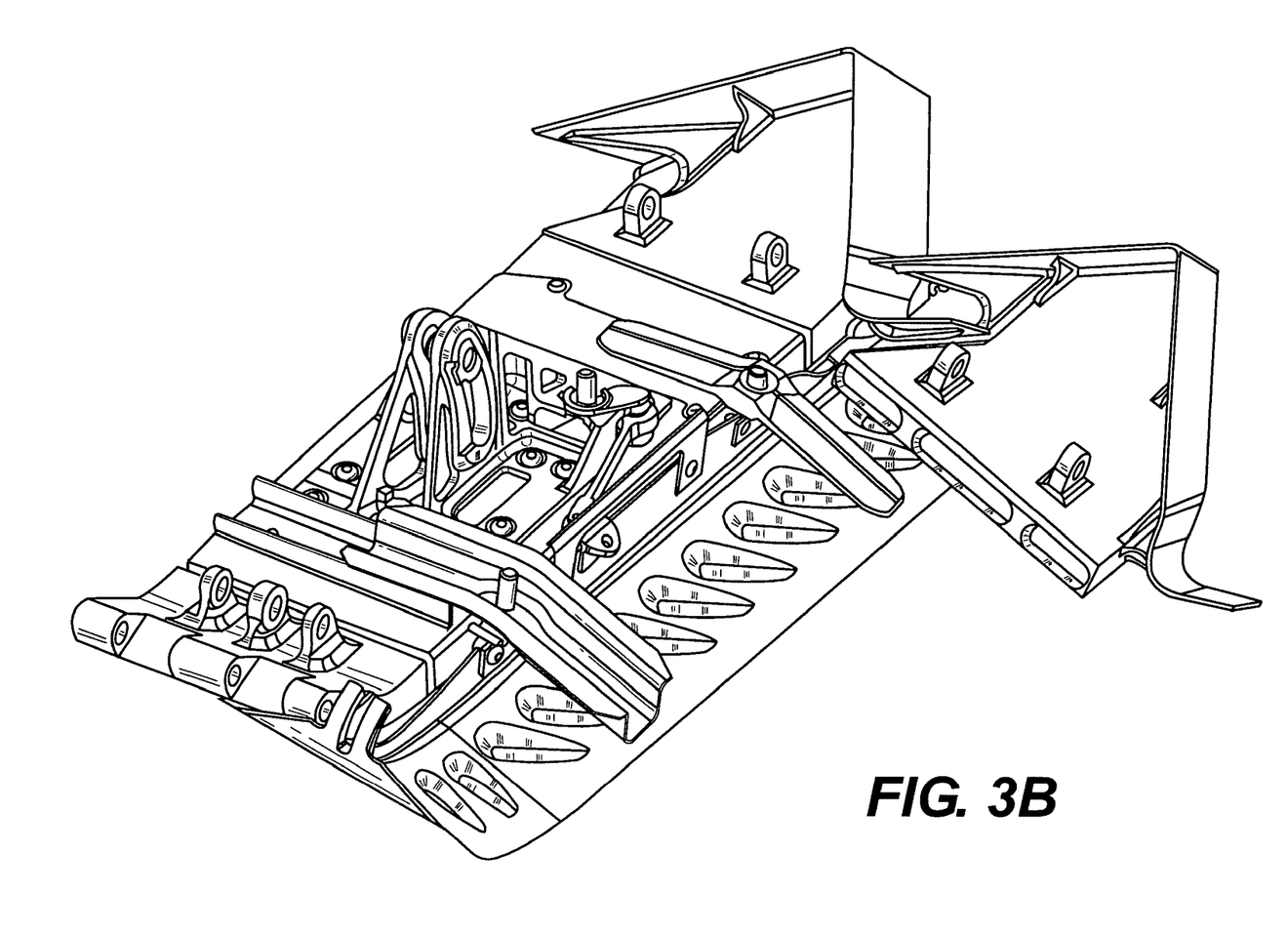
FIG. 3B is a general perspective view of a divergent section of the variable geometry exhaust nozzle from a cold side with an external flap removed and with the divergent section shown in a maximum position.

Referring to FIG. 3A, a divergent flap section 36 includes one divergent flap seal 21 with one divergent flap 18 mounted along each longitudinal side 54, 56 thereof. It should be understood that the flap section 36 as illustrated herein is for descriptive purposes and that the description applies to each adjacent flap 18 and flap seal 21 defined about the circumference of the nozzle 10. In FIG. 3A, the flap section 36 is illustrated from a side opposite the "hot-side" which is directly exposed to exhaust gases exiting the engine. The cold-side of the flap section 36 is defined as the side generally opposite the exhaust gas path.

Each flap seal 21 includes a body 38, a spine member 40 along a flap seal longitudinal axis L, a joint structure 42 and a flap position guide 44. The joint structure 42 forms a portion of the joint 20 which defines a hinge axis H that surrounds the engine centerline A (FIGS. 2A and 2B).

The flap seal body 38 may be described as having a length 46, defined as extending between a forward end section 48 and an aft end section 50, and a width 52 defined between the first longitudinal side 54 and the second longitudinal side 56. The body 38 is preferably a relatively planar member having a multitude of structural corrugations 57 or the like. Corrugation geometries other than that illustrated may also be utilized with the present invention. In other words, the flap seals 21 are preferably solid and not hollow as are the divergent flaps 18. The aft end section 50 is preferably of a chiseled shape to form a serrated nozzle end.

Figure 6:
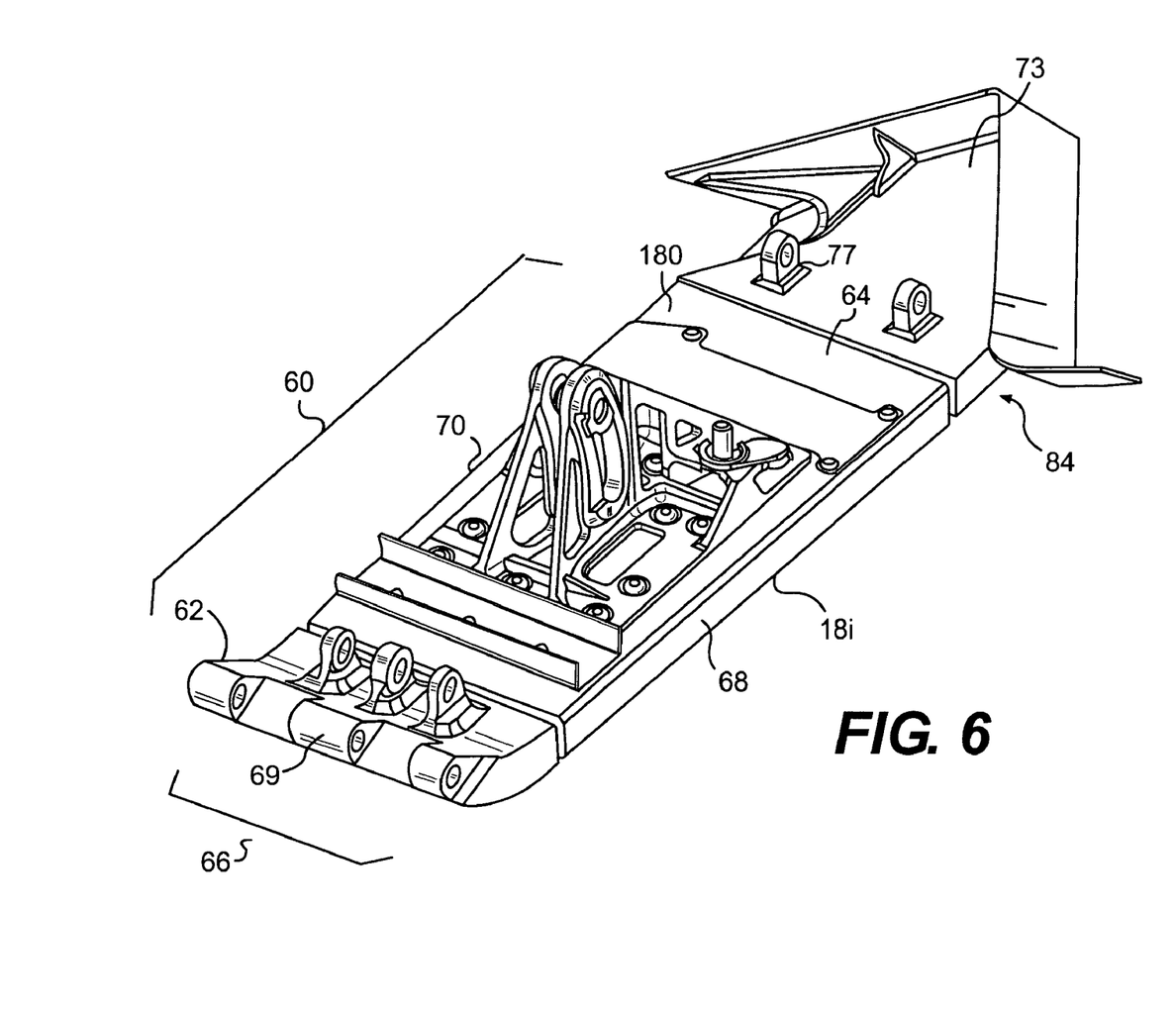
FIG. 6 is a general perspective view of a divergent flap according to the present invention from a cold side.

Each divergent flap 18 includes an inner skin 18i and an outer skin 18o (also illustrated in FIGS. 2A and 2B). The skins 18i, 18o preferably form a multiple of channels 72 which receive the cooling airflow C therethrough from an intake 74 adjacent to the joint structure 69 (FIGS. 2A and 2B). The divergent flap 18 may be described as having a length 60, defined as extending between a forward end section 62 and an aft end section 64, and a width 66 defined between a first longitudinal side 68 and a second longitudinal side 70 (FIG. 6). The forward end section 62 of each divergent flap 18 includes a joint structure 69 that forms a portion of the joint 20 (FIGS. 2A, 2B). The joint structure 69 corresponds with the divergent flap seal joint structure 42 along the hinge axis H. The aft end section 64 is preferably of a chiseled shape to form a serrated nozzle end.

Figure 4A:
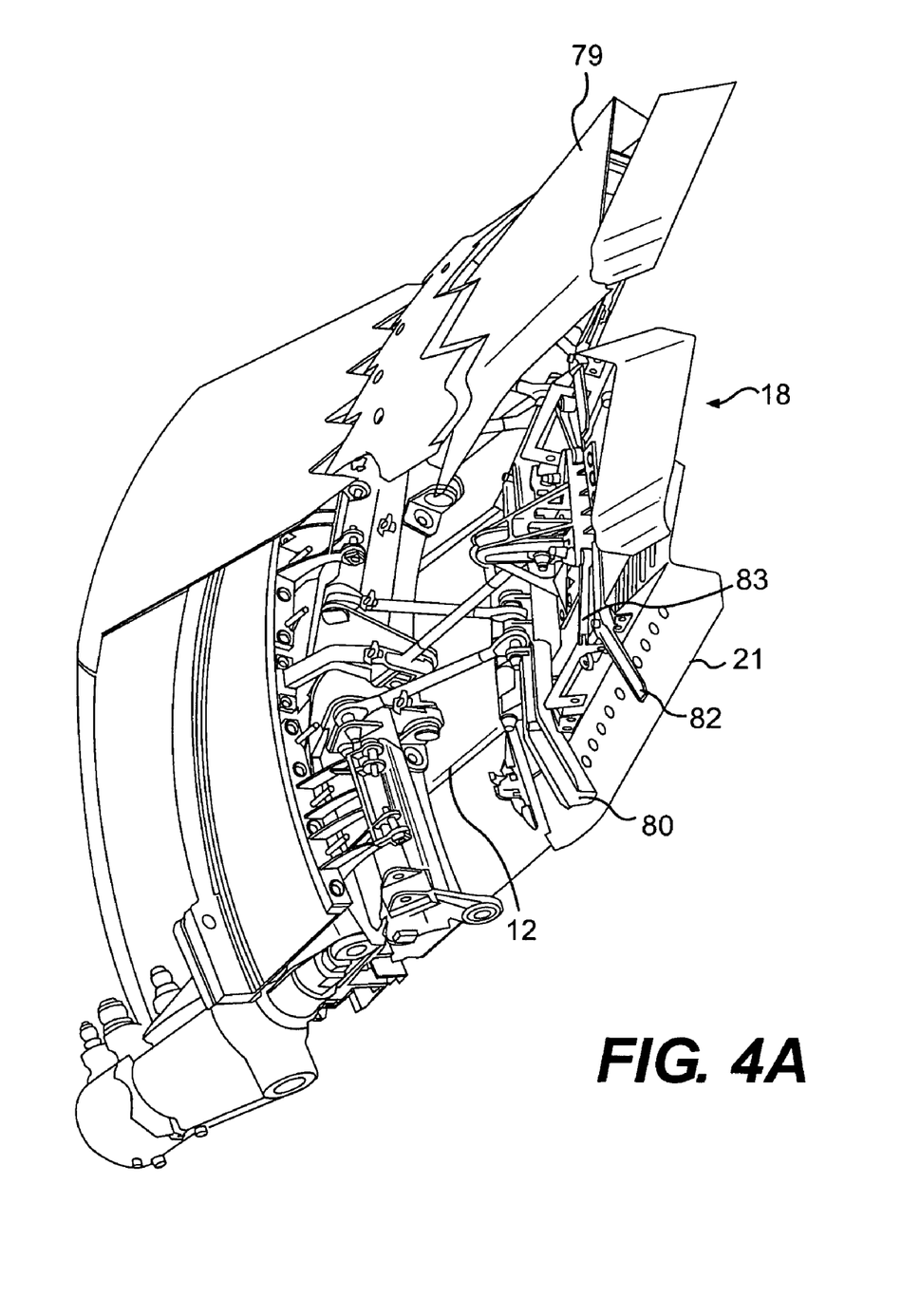
FIG. 4A is a general perspective partial phantom view of a segment of the variable geometry exhaust nozzle of the present invention with the nozzle shown in a maximum position.
Figure 4B:
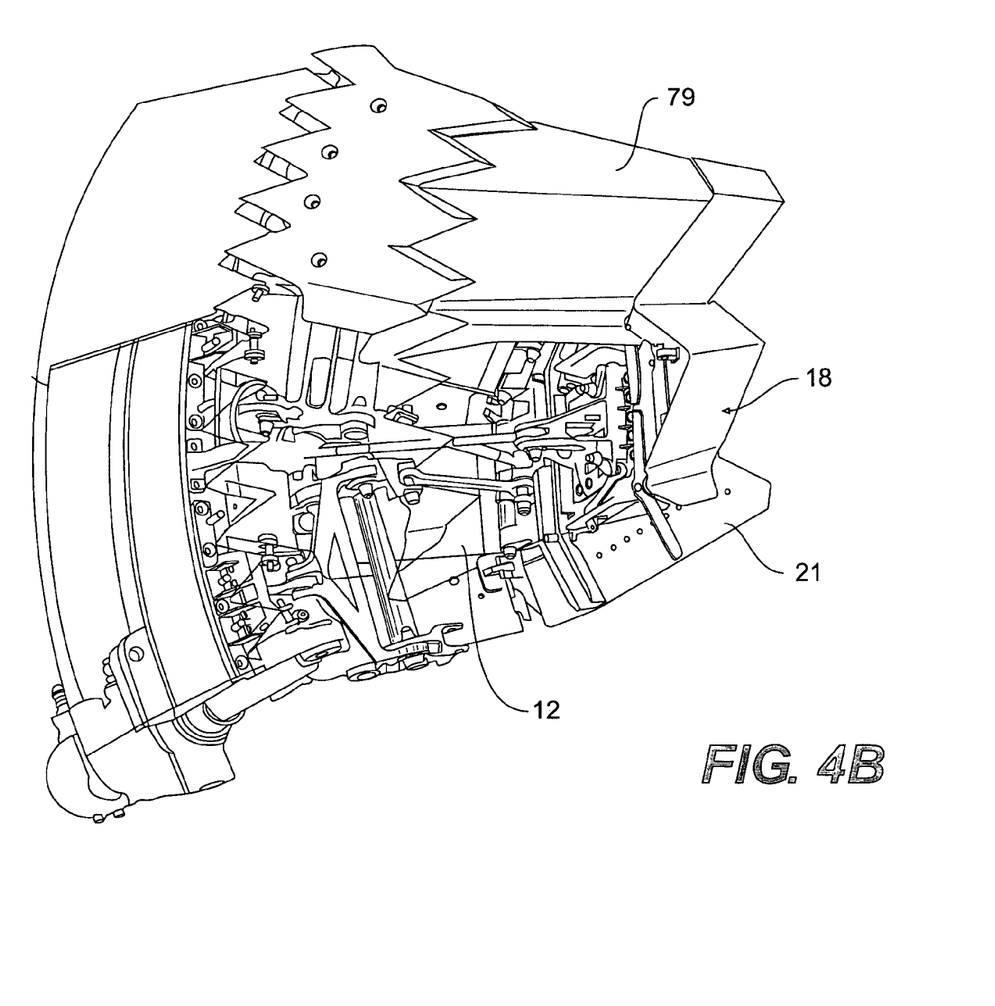
FIG. 4B is a general perspective partial phantom view of a segment of the variable geometry exhaust nozzle of the present invention with the nozzle shown in a minimum position.

The aft end section 64 of each divergent flap 18 includes a plow tip section 73 having a multiple of channels 75 (FIGS. 2A and 2B), which receive the cooling airflow C from corresponding channels 72 defined within the divergent flap 18 to then discharge the cooling airflow from a plow tip aft end segment. It should be understood that separate or integral tip sections of various shapes and configurations will benefit from the present invention. The plow tip section 73 is preferably chiseled and includes a hinge point 77 for attachment of an external flap 79 (FIGS. 4A and 4B). It should be understood that various plow tip sections planforms and profiles will be usable with the present invention.

Each divergent flap 18 preferably includes a forward bridge support 76 and an aft bridge support 78 which respectively receive a forward seal bridge bracket 80 and an aft seal bridge bracket 82 which bridge each divergent flap 18 and divergent seal 21 interface to link movement between adjacent divergent flaps 18 and flap seals 21 around the circumference of the nozzle 10. A centering linkage assembly 83 is restrained by the flap position guide 44 to further guide the dilation of the nozzle 10 during articulation between the maximum dilated position and the minimal dilated position and obtain generally synchronous movement between the divergent flaps 18 and divergent seals 21. It should be understood that various linkages and guides are usable with the present invention.

Figure 5A:
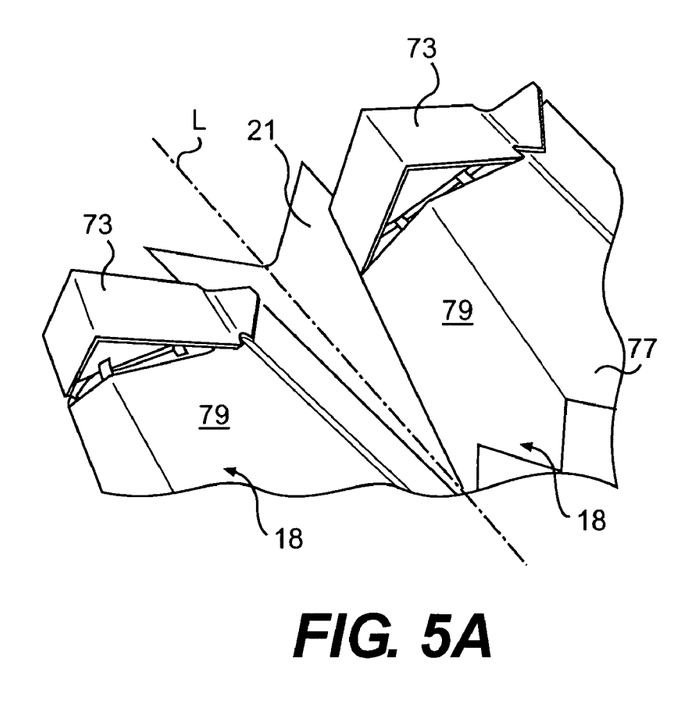
FIG. 5A is a general top perspective external view of a divergent section of the variable geometry exhaust nozzle with the divergent section shown in a maximum position.
Figure 5B:
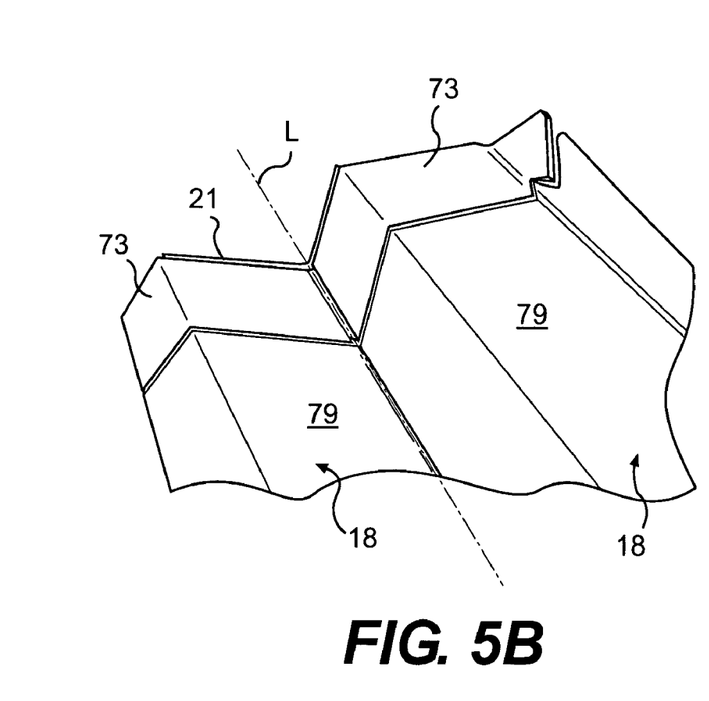
FIG. 5B is a general top perspective external view of a divergent section of the variable geometry exhaust nozzle with the divergent section shown in a minimum position.

The divergent flap seals 21 slide and at least partially overlap the inner skin 18i of each adjacent divergent flap 18 (also illustrated from the top in FIGS. 5A and 5B). The flap seals 21 form an inner layer within an outer layer defined by the divergent flaps 18 in which a flap seal 21 overlaps each gap between two adjacent divergent flaps 18 relative the nozzle centerline A.

Preferably, the first longitudinal side 68 of each divergent flap 18 includes a first set of extensions 84 and the second longitudinal side 70 includes a second set of extension 86 (also illustrated in FIG. 6). The first and second set of extensions 84, 86 extend laterally relative the longitudinal length of the divergent flap 18. Each of the extensions of the first set of extension 84 of the divergent flap 18 are located at longitudinal stations different than the longitudinal station of the second set of extensions 86 such that the extensions of adjacent divergent flaps 18 at least partially interfit when the nozzle 10 is in a minimal position (FIGS. 5B and 7B), but provide at least partial support for the intermediate flap seal 21 when the nozzle 10 is in the maximum position (FIGS. 5A and 7A).

Figure 7A:
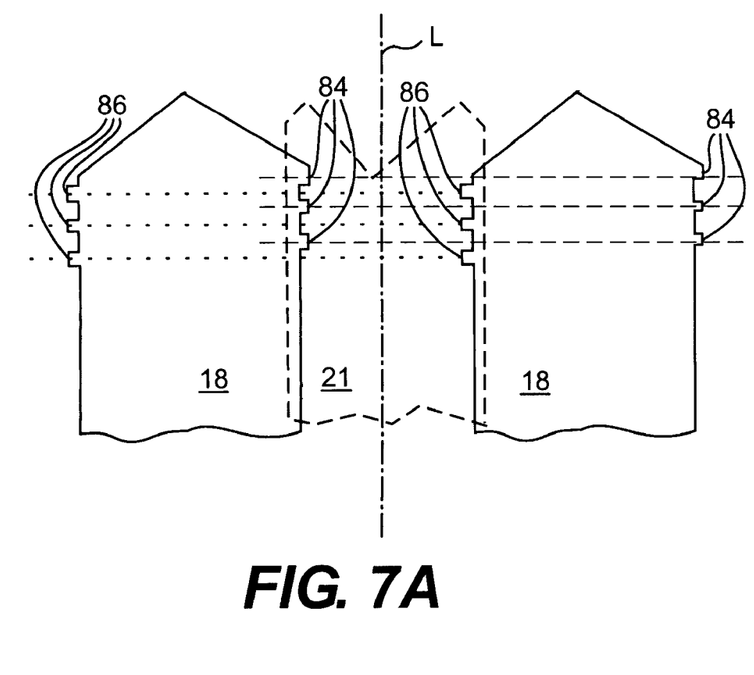
FIG. 7A is a general schematic view of a divergent section shown in a maximum position.
Figure 7B:
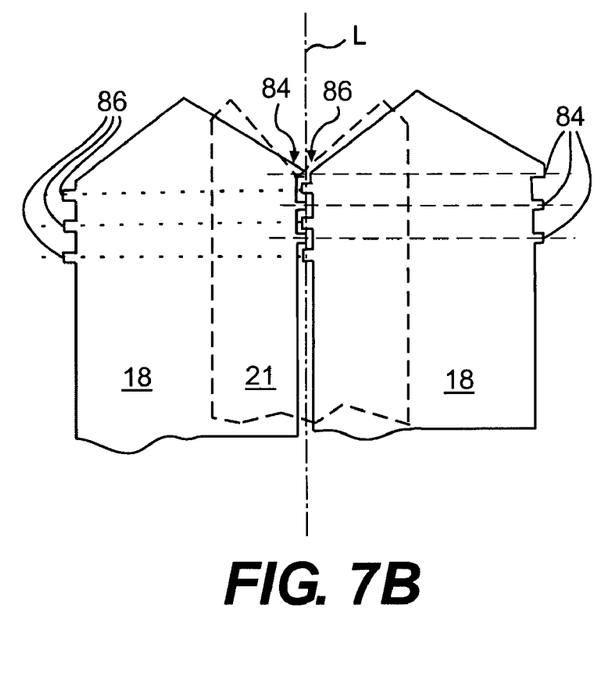
FIG. 7B is a general schematic view of a divergent section shown in a minimum position.

Each extension within the first and second set of extensions 84, 86 may take various forms and shapes so long as the first set of extensions 84 generally interfit with the second set of extensions 86 when the nozzle is in the minimum dilated position (FIGS. 5B and 7B). In other words, the extensions 84, 86 should be of some complementary shape which permit at leas some circumferential overlap between adjacent divergent flap pairs and over the intermediate flap seals.

Figure 8:
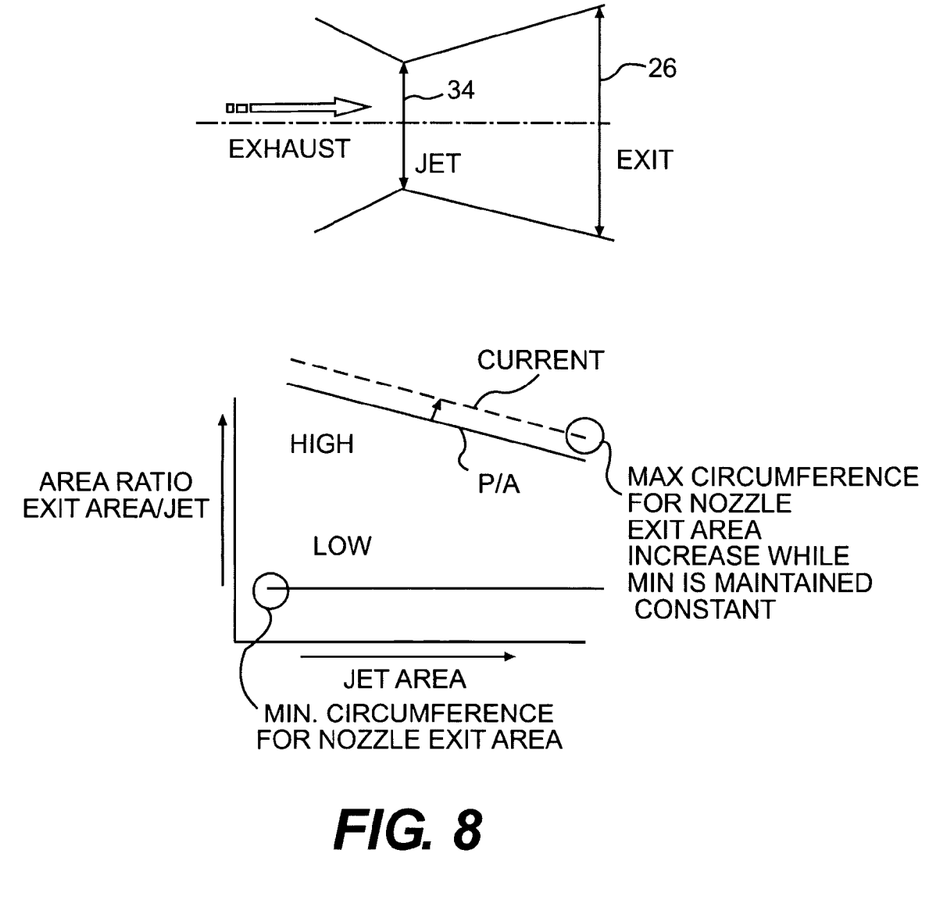
FIG. 8 is a graphical representation of an increase in area ratio range provided by the present invention.

Referring to FIGS. 5A and 7A, the nozzle 10 is in a maximum or afterburning position. The divergent flaps 18 are dilated away from a divergent flap seal longitudinal axis L such that the divergent flap seals 21 are at least partially supported on the extensions 84, 86 such that the max circumference of the nozzle is increased (FIG. 8). That is, the sets of extensions provide for an increased dilation of the nozzle 10 which increases the high-mode area ratio schedule.

Referring to FIGS. 5B and 7B, the nozzle 10 is in a minimum or non-afterburning position. The divergent flaps 18 are dilated toward the divergent flap seal longitudinal axis L such that the extensions 84, 86 interfit to provide the minimum circumference of the nozzle 10 at the low-mode area ratio schedule. This provides a relative increase in the area ratio range (nozzle circumference increased in maximum position while nozzle circumference maintained in minimum position; FIG. 8) which results in more efficient engine performance with increased engine thrust, fuel efficiency and a significant decrease in actuator loads required to articulate the nozzle between the maximum and minimum positions.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A convergent/divergent nozzle system comprising:
   a divergent flap seal pivotably mounted about a hinge axis which circumscribes a nozzle centerline, said divergent flap seal defining a flap seal longitudinal axis between a first flap seal longitudinal side and a second flap seal longitudinal side;
   a first divergent flap pivotably mounted about said hinge axis adjacent said first flap seal longitudinal side, said first divergent flap having a first divergent flap longitudinal side with at least one extension which extends therefrom which faces toward said flap seal longitudinal axis, said at least one extension located at a first longitudinal station; and
   a second divergent flap pivotably mounted about said hinge axis adjacent said second flap seal longitudinal side, said second divergent flap having a second divergent flap longitudinal side with at least one extension which extends therefrom which faces toward said flap seal longitudinal axis, said at least one extension located at a second longitudinal station different from said first longitudinal station such that said at least one extension which extends from said first divergent flap longitudinal side at least partially interfits with said at least one extension which extends from said second divergent flap longitudinal side when the nozzle is in a minimum position.

2. The convergent/divergent nozzle system as recited in claim 1, wherein said at least one extension which extends from said first divergent flap longitudinal side and said at least one extension which extends from said second divergent flap longitudinal side at least partially supports said divergent flap seal when the nozzle is in a maximum position.

3. The convergent/divergent nozzle system as recited in claim 1, further comprising a linkage mounted to said divergent flap seal, said linkage connected to said first divergent flap and said second divergent flap.

4. The convergent/divergent nozzle system as recited in claim 1, further comprising a first plow tip mounted to said first divergent flap and a second plow tip mounted to said second divergent flap, said first plow tip at least partially interfits with said second plow tip when the nozzle is in the minimum position.

5. A convergent/divergent nozzle system comprising:
   a multitude of divergent flap seals and a multitude of divergent flaps pivotably mounted about a hinge axis which circumscribes a nozzle centerline, said multitude of divergent flap seals and said multitude of divergent flaps movable between an maximum nozzle position and a minimum nozzle position, each of said multitude of divergent flaps including at least one extension on a first longitudinal side and at least one extension on a second longitudinal side such that said at least one extension on said first longitudinal side of one of said multitude of divergent flaps interfits with said at least one extension on said second longitudinal side on an adjacent divergent flap of said multitude of divergent flaps at said minimum nozzle position and at least partially support one of said multitude of divergent flaps seals intermediate said divergent flap and said adjacent divergent flap at said maximum nozzle position.

6. The convergent/divergent nozzle system as recited in claim 5, wherein each of said multitude or divergent flaps are pivotably mounted to an associated convergent flap.

7. A method of increasing an area ratio range of a convergent/divergent nozzle system with a multitude of divergent flap seals and a multitude of divergent flaps, each of said divergent flap seals distributed circumferentially intermediate a first and second adjacent divergent flap comprising the steps of:
(1) interfitting at least one extension on a first longitudinal side of at least one of the multitude of divergent flaps with at least one extension on a second longitudinal side of an adjacent divergent flap the nozzle system is in a minimum nozzle position.

8. A method as recited in claim 7, further comprises the step of:
(2) at least partially supporting a divergent flap seal intermediate the first and second adjacent divergent flaps with the at least one extension on the first longitudinal side of one of the divergent flaps and the at least one extension on the second longitudinal side of the other divergent flap when the nozzle is in a maximum nozzle position.

* * * * *

UNITED STATES PATENT AND TRADEMARK OFFICE
CERTIFICATE OF CORRECTION

| | | |
|---|---|---|
| PATENT NO. | : 7,624,567 B2 | Page 1 of 1 |
| APPLICATION NO. | : 11/231067 | |
| DATED | : December 1, 2009 | |
| INVENTOR(S) | : Donald William Peters | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this

Twenty-first Day of December, 2010

David J. Kappos
*Director of the United States Patent and Trademark Office*